(12) United States Patent
Kim et al.

(10) Patent No.: US 10,908,702 B2
(45) Date of Patent: *Feb. 2, 2021

(54) APPARATUS AND METHOD FOR AUTOMATIC DISPLAY CONTROL OF A VIDEO IMAGE IN MOBILE TERMINAL

(71) Applicant: Samsung Electronics Co., Ltd., Gyeonggi-do (KR)

(72) Inventors: Dong Sub Kim, Gyeongsanbuk-do (KR); Moon Hyuk Choi, Gyeongsanbuk-do (KR); Seong Jun Ban, Gyeongsanbuk-do (KR)

(73) Assignee: Samsung Electronics Co., Ltd.

( * ) Notice: Subject to any disclaimer, the term of this patent is extended or adjusted under 35 U.S.C. 154(b) by 0 days.

This patent is subject to a terminal disclaimer.

(21) Appl. No.: 16/845,704

(22) Filed: Apr. 10, 2020

(65) Prior Publication Data
US 2020/0241658 A1    Jul. 30, 2020

Related U.S. Application Data

(63) Continuation of application No. 16/725,447, filed on Dec. 23, 2019, now abandoned, which is a (Continued)

(30) Foreign Application Priority Data

Apr. 4, 2006 (KR) .......................... 10-2006-0030430

(51) Int. Cl.
 *G06F 3/0346* (2013.01)
 *G06F 1/16* (2006.01)
 (Continued)

(52) U.S. Cl.
 CPC .......... *G06F 3/0346* (2013.01); *G06F 1/1626* (2013.01); *G06F 1/1647* (2013.01);
 (Continued)

(58) Field of Classification Search
 CPC ........ G06F 3/0346; G06F 3/02; G06F 1/1686; G06F 1/1647; G06F 1/1684; G06F 3/017;
 (Continued)

(56) References Cited

U.S. PATENT DOCUMENTS 5,682,529 A   10/1997   Hendry et al.
6,125,289 A   9/2000   Lee
(Continued)

FOREIGN PATENT DOCUMENTS

CN       1170410       10/2004
CN       1551596       12/2004
(Continued)

*Primary Examiner* — Maurice L. McDowell, Jr.
(74) *Attorney, Agent, or Firm* — The Farrell Law Firm, P.C.

(57) ABSTRACT

An apparatus and method for automatically controlling screens displayed on two display units of a mobile terminal are provided. The method includes receiving an input requesting to operate a camera of the mobile terminal; providing a video image that is obtained via the camera through a first display area disposed in a first surface of the mobile terminal or a second display area disposed in a second surface being opposite to the first surface of the mobile terminal, based on a camera mode, wherein the camera mode includes a first mode and a second mode; while providing the video image obtained via the camera through the first display area or the second display area, detecting a rotation of the mobile terminal; and in response to detecting the rotation, switching a display area providing the video image between the first display area and the second display area.

8 Claims, 10 Drawing Sheets

Related U.S. Application Data continuation of application No. 16/006,419, filed on Jun. 12, 2018, now Pat. No. 10,514,778, which is a continuation of application No. 15/169,044, filed on May 31, 2016, now Pat. No. 10,001,846, which is a continuation of application No. 14/163,520, filed on Jan. 24, 2014, now Pat. No. 9,508,307, which is a continuation of application No. 13/593,852, filed on Aug. 24, 2012, now Pat. No. 8,638,325, which is a continuation of application No. 11/604,837, filed on Nov. 28, 2006, now Pat. No. 8,284,215.

(51) Int. Cl.

| | | |
|---|---|---|
| *H04M 1/725* | (2006.01) | |
| *G06F 3/02* | (2006.01) | |
| *G06F 3/01* | (2006.01) | |
| *G09G 3/36* | (2006.01) | |
| *G09G 5/14* | (2006.01) | |
| *H04N 5/232* | (2006.01) | |
| *H04N 7/14* | (2006.01) | |

(52) U.S. Cl.
CPC .......... *G06F 1/1671* (2013.01); *G06F 1/1684* (2013.01); *G06F 1/1686* (2013.01); *G06F 3/017* (2013.01); *G06F 3/02* (2013.01); *G09G 3/36* (2013.01); *G09G 5/14* (2013.01); *H04M 1/72522* (2013.01); *G06F 2200/1637* (2013.01); *H04M 1/72558* (2013.01); *H04M 2250/12* (2013.01); *H04M 2250/16* (2013.01); *H04M 2250/52* (2013.01); *H04N 5/23293* (2013.01); *H04N 2007/145* (2013.01)

(58) Field of Classification Search
CPC ................. G06F 1/1626; G06F 1/1671; G06F 2200/1637; G09G 3/36; G09G 5/14; H04M 1/72522; H04M 1/72558; H04M 2250/12; H04M 2250/52; H04M 2250/16; H04N 5/23293; H04N 2007/145
See application file for complete search history.

(56) References Cited

U.S. PATENT DOCUMENTS

| | | | |
|---|---|---|---|
| 9,508,307 B2 | 11/2016 | Kim | |
| 10,514,778 B2 * | 12/2019 | Kim | .................. H04M 1/72522 |
| 2002/0094826 A1 | 7/2002 | Lee | |
| 2003/0153283 A1 | 8/2003 | Kuwazoe | |
| 2004/0023685 A1 | 2/2004 | Nakamura | |
| 2005/0083642 A1 | 4/2005 | Senpuku et al. | |
| 2005/0090288 A1 | 4/2005 | Stohr et al. | |
| 2005/0140565 A1 | 6/2005 | Krombach | |
| 2005/0143137 A1 | 6/2005 | Matsunaga et al. | |
| 2005/0219372 A1 | 10/2005 | Watanabe | |
| 2005/0259032 A1 | 11/2005 | Morris | |
| 2007/0188450 A1 * | 8/2007 | Hernandez | ............ G06F 1/1626 345/158 |

FOREIGN PATENT DOCUMENTS

| | | |
|---|---|---|
| EP | 1 231 757 | 9/2003 |
| EP | 1 601 166 | 11/2005 |
| GB | 2384132 | 7/2003 |
| JP | 2005340947 | 8/2005 |
| JP | 2005-252969 | 9/2005 |
| KR | 1020020078373 | 10/2002 |
| KR | 1020020090453 | 12/2002 |
| KR | 1020040055141 | 6/2004 |
| KR | 1020060076920 | 7/2006 |
| KR | 1020060078364 | 7/2006 |
| WO | WO 01/86920 | 11/2001 |
| WO | WO 2005/002755 | 1/2005 |

\* cited by examiner

APPARATUS AND METHOD FOR AUTOMATIC DISPLAY CONTROL OF A VIDEO IMAGE IN MOBILE TERMINAL

CROSS-REFERENCE TO RELATED PATENT APPLICATION

This application is a Continuation of U.S. patent application Ser. No. 16/725,447, filed in the U.S. Patent and Trademark Office (USPTO) on Dec. 23, 2019, which is a Continuation of U.S. patent application Ser. No. 16/006,419, filed in the USPTO on Jun. 12, 2018, issued as U.S. Pat. No. 10,514,778 on Dec. 24, 2019, which is a Continuation of U.S. patent application Ser. No. 15/169,044, filed in the USPTO on May 31, 2016, issued as U.S. Pat. No. 10,001,846 on Jun. 19, 2018, which is a Continuation of U.S. patent application Ser. No. 14/163,520, filed in the USPTO on Jan. 24, 2014, issued as U.S. Pat. No. 9,508,307 on Nov. 29, 2016, which is a Continuation of U.S. patent application Ser. No. 13/593,852, filed in the USPTO on Aug. 24, 2012, and issued as U.S. Pat. No. 8,638,325 on Jan. 28, 2014, which is a Continuation of U.S. patent application Ser. No. 11/604,837, filed in the USPTO on Nov. 28, 2006, and issued as U.S. Pat. No. 8,284,215 on Oct. 9, 2012, and claims priority under 35 U.S.C. § 119(a) to Korean Patent Application No. 10-2006-0030430, filed in the Korean Intellectual Property Office on Apr. 4, 2006, the entire disclosure of each of which is incorporated herein by reference.

BACKGROUND OF THE INVENTION

Field of the Invention

The present invention generally relates to a mobile terminal. More particularly, the present invention relates to an apparatus for automatic on/off control of a dual liquid crystal display (hereinafter, LCD) installed in a mobile terminal, and a method thereof.

Description of the Prior Art

With recent developments in the wireless communication technology, the use of mobile terminals has rapidly increased. As a result of popularization of mobile terminals, communication service companies currently provide various kinds of services to satisfy telephone subscribers' requirements, such as a wireless Internet service, short message service, and multimedia service including screen images and moving pictures, in addition to a voice communication service free from restriction in time and space.

The mobile terminal has a basic function of performing voice communication with another mobile phone or a wired telephone through a base station while freely moving in a mobile communication service area, and has additional functions of performing data communication, such as personal information management, information exchange with a computer and with the Internet. Recently, new mobile terminals appearing frequently in the market provide a better performance improved by providing transmission and reception of screen images or moving pictures, virtual 3-dimensional stereo sounds, MP3 player function, and integration of camera for picture-taking.

According to its functions, a mobile terminal may be classified as a terminal having an Internet function, terminal having a character transmission function, terminal having a moving picture function, terminal having a user's health check function, and terminal having a game function. Additionally, digital multimedia services, such as a digital television service or a video on demand service, have been commercialized. Some existing mobile terminals provide a 3-dimensional game function, which is more developed than a game function using a simple text, and a messenger function.

Recently, mobile terminals have continuously been changed and developed in their forms and functions. In their forms, mobile terminals have been developed in various types such as a bar type, flip type, folder type, dual folder type and slide type. In their functions, mobile terminals have been developed to provide various functions such as a game function, a video on demand function, an electronic dictionary function and a MP3 player function, in addition to their basic function of a phone call.

Although the mobile terminals have been greatly developed in their forms and functions, display units for displaying information have not been developed so much in their forms and functions. In conventional mobile terminals of a dual folder type or slide type, a waiting screen is displayed or a screen of a correspondingly requested function is displayed by operating an LCD, when a folder opens or slides sideways.

The LCD displays a waiting screen during initialization, and if a function is requested by a user during the initialization, the LCD displays only a specific screen by switching to a screen corresponding to the requested function. Such an LCD operating method displays a screen corresponding to an additional function performed by the mobile terminal. When the mobile terminal operates in a camera mode, only a screen related to the camera mode is displayed. Alternatively, when the mobile terminal operates in a MP3 mode, only a screen related to the MP3 mode is displayed.

Accordingly, in the conventional mobile terminals, various screens having additional functions may not comprehensively be used. Usability of the mobile terminal and user convenience decreases, because only one LCD is used and the size of the LCD screen is relatively small.

Accordingly, there is a need for an improved apparatus and method for controlling an automatic display in a mobile terminal using a dual LCD comprising additional functions.

SUMMARY OF THE INVENTION

An aspect of the present invention is to address at least the above problems and/or disadvantages and to provide at least the advantages described below. Accordingly, an aspect of exemplary embodiments of the present invention is to provide an apparatus and a method for supplying a service for user convenience in using a dual LCD in a mobile terminal.

Another aspect of the present invention is to provide an apparatus and a method for controlling automatic display of a dual LCD in a mobile terminal.

Another aspect of the present invention is to provide an apparatus and a method for automatic on/off control of a dual LCD by using a sensing unit in a mobile terminal, and for automatically displaying screens of additional functions correspondingly.

Another aspect of the present invention is to provide an apparatus and a method for automatically changing or simultaneously displaying additional functions corresponding to rotation angles of a mobile terminal.

In accordance with an aspect of the present invention, a method is provided for operating a portable communication device. The method includes receiving an input for request of operating a camera of the portable communication device; providing a video image that is obtained via the camera through a first display area disposed in a first surface of the portable communication device or a second display area disposed in a second surface being opposite to the first surface of the portable communication device, based on a camera mode, wherein the camera mode includes at least a first mode and a second mode; while providing the video image that is obtained via the camera through the first display area or the second display area, detecting a rotation of the portable communication device; and in response to detecting the rotation, switching a display area providing the video image between the first display area and the second display area.

In accordance with another aspect of the present invention, a portable communication device is provided, which includes a touchscreen display including a first display area disposed in a first surface of the portable communication device and a second display area disposed in a second surface being opposite to the first surface of the portable communication device; a sensor; a camera; and a processor configured to receive an input for request of operating the camera, provide a video image that is obtained via the camera through the first display area or the second display area based on a camera mode, the camera mode including at least a first mode and a second mode, while providing the video image obtained via the camera through the first display area or the second display area, detect, via the sensor, a rotation of the portable device, and in response to detecting the rotation, switch a display area providing the video image between the first display area and the second display area.

BRIEF DESCRIPTION OF THE DRAWINGS

The above and other aspects, features, and advantages of certain embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention disclose an apparatus and a method for providing a service for user convenience in using a mobile terminal. For example, the present invention provides a mobile terminal having a dual liquid crystal display (hereinafter, LCD), and enables display of additional functions desired by the user through one or two LCDs by using the dual LCD.

Although the LCD is described as an example of a display unit according to exemplary embodiments of the present invention, the present invention is not limited thereto.

The present invention provides an automatic changeover between two LCDs by using a sensing unit in a mobile terminal having a dual LCD, and automatic display of additional function screens on the corresponding LCD.

For example, when the front surface of the mobile terminal is formed as a conventional phone face and the rear surface is formed as a MP3 face, the LCD of the front surface (that is, phone screen) and the LCD of the rear surface (that is, MP3 screen) are automatically displayed according to operation of the sensing unit. Additionally, the LCDs of the front and rear surfaces are automatically switched on/off corresponding to a function desired by the user. In this example, the mobile terminal may have various forms including an MP3 face corresponding to additional functions to be utilized in the mobile terminal.

Although a mobile terminal is hereinafter described as an example for convenience in explanation, the present invention is not limited thereto. The mobile terminal according to the exemplary embodiments of the present invention is a terminal for providing user convenience. The terminal for providing user convenience may be information and communication equipment, such as a mobile terminal, mobile phone, wired/wireless telephone, smart phone, International Mobile Telecommunication 2000 (IMT-2000) terminal, and Universal Mobile Telecommunication Service (UMTS) terminal, and their applications.

First, a configuration of a mobile terminal according to an exemplary embodiment of the present invention is described as follows.

Figure 1A:
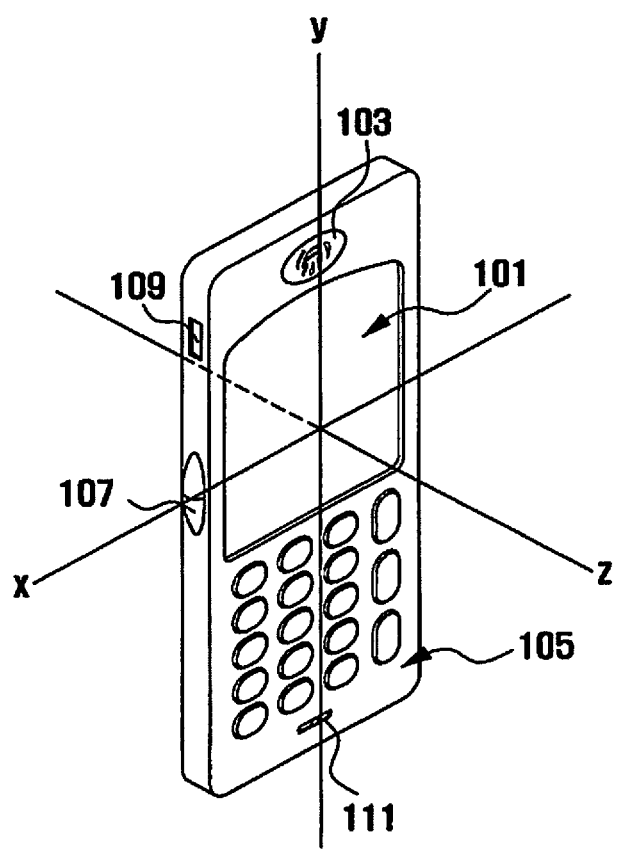
FIGS. 1A and 1B are schematic views of a mobile terminal according to an exemplary embodiment of the present invention.
Figure 1B:
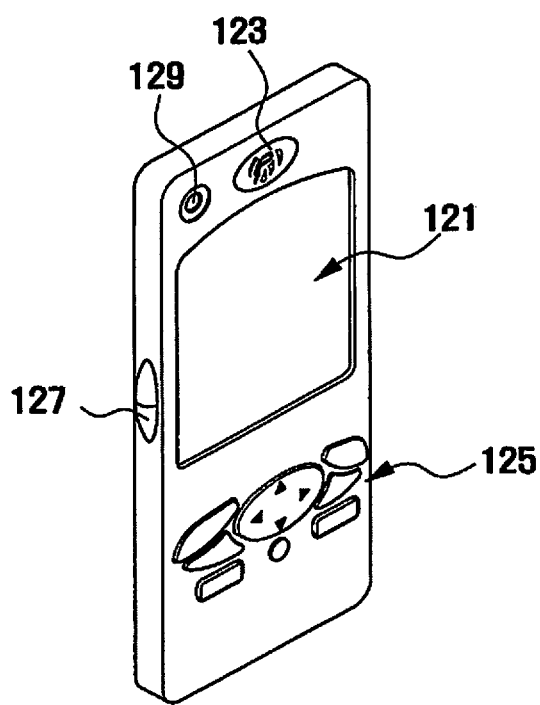

FIGS. 1A and 1B are schematic views of a mobile terminal according to an exemplary embodiment of the present invention.

Referring to FIGS. 1A and 1B, the mobile terminal according to an exemplary embodiment of the present invention may be divided into a mobile terminal portion and an additional function portion. Referring to the mobile terminal portion shown in FIG. 1A and the additional function portion shown in FIG. 1B provided on a front surface and a rear surface respectively, the front surface may be configured with a conventional mobile terminal function and the rear surface may be configured with an additional function such as a MP3 or camera.

However, an exemplary embodiment of the present invention is not limited thereto. The front and rear surfaces are preferably reversible, and various additional functions may be executed according to the structure of the front and rear surfaces.

As shown in FIG. 1A, the front surface of the mobile terminal according to an exemplary embodiment of the present invention may include a first display unit 101 for displaying screens related to the mobile terminal, such as an execution screen of a conventional mobile terminal, communication screen, game screen, character message service screen, picture-taking screen for a camera function, and moving picture screen; a receiver 103 for outputting a voice signal received during communication with the mobile terminal; a first keypad 105 for inputting number/character data and control data for functions predetermined by a user; and a microphone 111 for receiving a voice signal from the user.

As shown in FIG. 1B, the rear surface of the mobile terminal according to an exemplary embodiment of the present invention may include a second display unit 121 for displaying additional function screens of the mobile terminal such as a MP3 screen, picture-taking screen related to a camera function, game screen, and moving picture screen; a speaker 123 for outputting an audio signal related to the additional functions of the mobile terminal; a second keypad 125 for receiving commands for additional functions and control data for predetermined functions; and a camera 129 for capturing image data through picture-taking.

As shown in FIG. 1A, a side surface of the mobile terminal according to an exemplary embodiment of the present invention may include a volume control key 107 for adjusting volume and an earphone jack 109 for providing an interface for transmission of a voice or audio signals through an earphone. As shown in FIG. 1B, another side surface of the mobile terminal may include a shortcut key 127 for instant execution of a mapped function such as a camera function.

Additionally, the mobile terminal according to an exemplary embodiment of the present invention is preferably installed with a touch panel. For example, the first display unit 101 of FIG. 1A and the second display unit 121 of FIG. 1B may include an LCD in a touch screen form. The camera 129 of FIG. 1B may be installed on the front surface of FIG. 1A corresponding to the configuration of the mobile terminal, or may be installed on both surfaces of FIGS. 1A and 1B as a dual camera.

In the mobile terminal having the above configuration, if the user turns the front surface to the rear side by rotating the mobile terminal, a MP3 execution screen is automatically displayed on the second display unit 121. If the user then returns the rearward-facing surface back to the front side by rotating the mobile terminal, an execution screen of the mobile terminal is automatically displayed on the first display unit 101. That is, the mobile terminal according to the present invention provides an automatic on/off control of two display units (that is, dual LCD) and automatic display control of execution screens corresponding to additional functions.

For convenience in explanation, FIGS. 1A and 1B show schematic examples of the mobile terminal according to an exemplary embodiment of the present invention. However, the present invention is not limited thereto, and the mobile terminal may be formed in various shapes by selectively combining various means described above.

Figure 2:
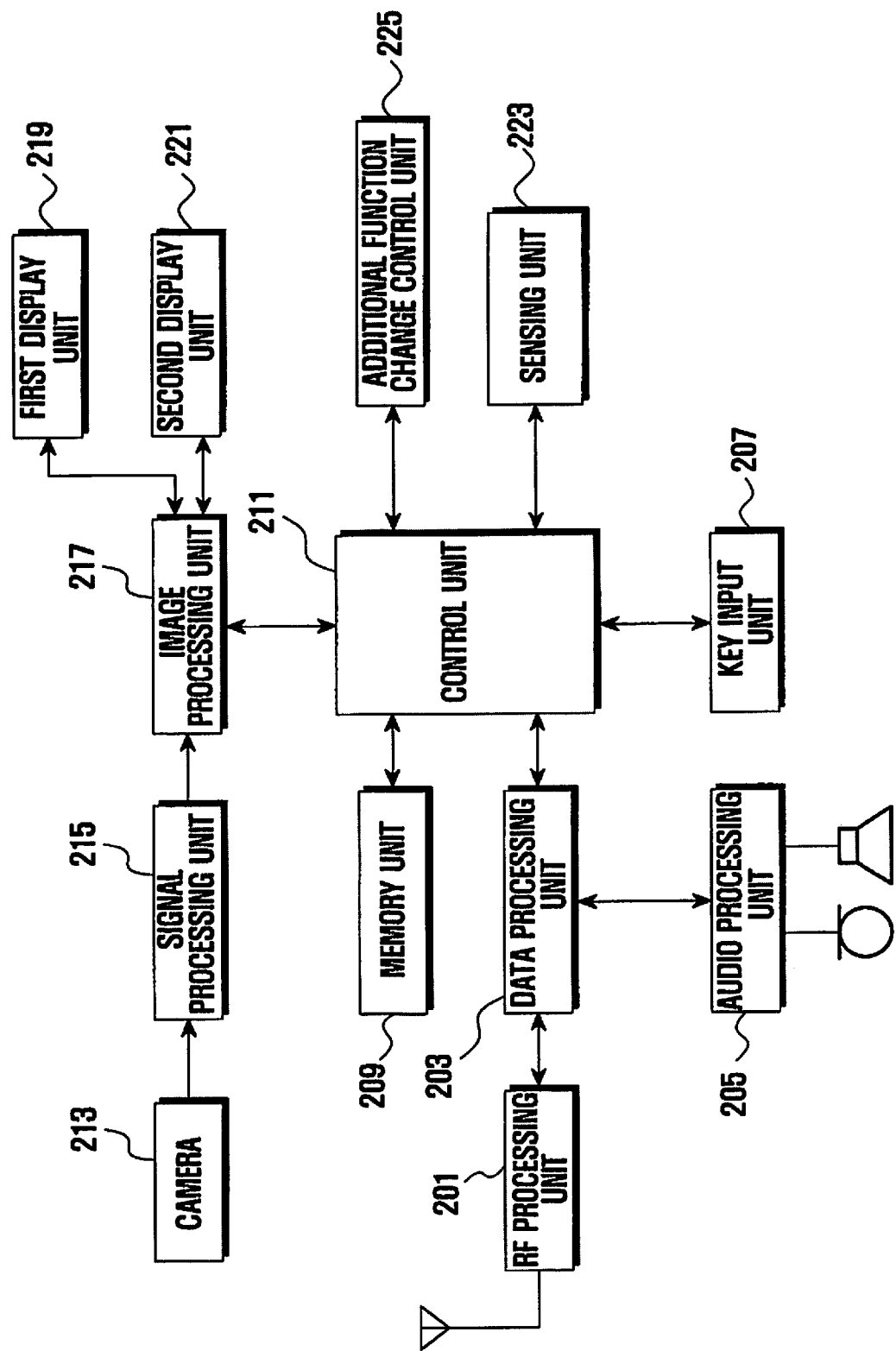
FIG. 2 is a schematic block diagram showing a configuration of a mobile terminal according to an exemplary embodiment of the present invention.

FIG. 2 is a schematic block diagram showing a configuration of a mobile terminal according to an exemplary embodiment of the present invention.

Referring to FIG. 2, the mobile terminal according to an exemplary embodiment of the present invention is generally divided into an input means, processing means, storage means, output means, and communication means.

The input means includes an audio processing unit 205 for processing a voice signal input through a microphone, key input unit 207 for inputting number/character data and control data for functions predetermined by a user, and camera 213 for capturing image data through picture-taking. The input means receives a voice signal, number/character data and multimedia data such as image data through the above component devices.

The processing means includes a signal processing unit 215 for converting image data input by the camera 213 to a digital signal, an image processing unit 217 for processing/outputting input image data digitally processed by the signal processing unit 215 and additional function data changed corresponding to the dual LCD (that is, a first display unit 219 and a second display unit 221); a data processing unit 203 for processing a voice signal transmitted by the audio processing unit 205, number/character data input by a user through the key input unit 207, and additional execution/operation data; a control unit 211 for performing control operations for internal blocks of the mobile terminal; a sensing unit 223 for detecting the direction and range of the mobile terminal's rotation; and an additional function change control unit 225 for controlling additional functions and changing an additional function displayed on the first display unit 219 and the second display unit 221 corresponding to information provided by the sensing unit 223. The processing means performs operations corresponding to user data input by the input means, such as voice data, character data, image data, and additional functions requested by the user.

The storage means includes a memory unit 209, and stores the user data input by the user through the input means and programs for providing automatic on/off function of the dual LCD of the mobile terminal.

The output means includes a first display unit 219 and a second display unit 221 for outputting screens of information on the input/requested user data and additional functions for the user, and the audio processing unit 205 for outputting a voice signal or audio data externally. The output means outputs screens corresponding to the user data input by the input means or stored in the storage means and to various additional functions.

The communication means performs wireless transmission of the user data to another user or transmission and reception of contents by connecting to an external web server, and includes a radio frequency (hereinafter, RF) processing unit 201 and an antenna.

The RF processing unit 201 performs communication operations related to a voice communication, short message service (SMS) or multimedia messaging service (MMS) communication, and data communication. The RF processing unit 201 includes an RF transmitter for upconverting and amplifying the frequency of a transmitting signal and an RF receiver for low-noise amplifying and downconverting the frequency of a received signal.

The data processing unit 203 may include a means for encoding and modulating a signal transmitted by the RF processing unit 201 and a means for decoding and demodulating a signal received by the RF processing unit 201. The audio processing unit 205 plays an audio signal received from the data processing unit 203 or transmits an audio signal such as a voice input by a microphone to the data processing unit 203.

The key input unit 207 inputs number and character information, and includes number keys, character keys, and function keys for setting various functions. The function keys may include a volume key, direction keys, shortcut keys, and keys mapped correspondingly. Additionally, the key input unit 207 includes a first key pad and a second key pad installed on the front surface and rear surface respectively of the mobile terminal according to an exemplary embodiment of the present invention.

The memory unit 209 may include a program area and a data area. The program area stores programs for general operation control of the mobile terminal and programs for automatic on/off control and display of the dual LCD installed on the front and rear surfaces of the mobile terminal according to an exemplary embodiment of the present invention.

The data area stores data generated during the execution of the programs and setup information on the automatic display of the dual LCD, and may include a database.

The programs controlling the automatic on/off control of the dual LCD may include a program for extracting operation control information for the automatic display of the dual LCD from a value detected by a sensor, a program for on/off control and automatic display of the dual LCD corresponding to input information related to the automatic display function of the dual LCD (that is, operation control information), a program for an automatic change and control of additional function screens displayed on the dual LCD corresponding to on/off states of the dual LCD, and a program for displaying one or more additional functions simultaneously corresponding to the operation state of the dual LCD.

The control unit 211 controls general operation of the mobile terminal. If a setup change signal for the automatic display of the dual LCD is input by the key input unit 207, the control unit 211 controls corresponding mode setting and operation of the sensing unit 223. Additionally, if information on the rotation or direction change of the mobile terminal is input by the sensing unit 223, the control unit 211 controls the corresponding operation. For example, if the sensing unit 223 detects a direction change of the mobile terminal and transmits the corresponding information, the control unit 211 controls switching on/off and automatic display of the dual LCD corresponding to the information. Additionally, the control unit 211 synchronizes with the additional function change control unit 225, and controls automatic display of additional function screens according to the changeover of the dual LCD.

The control unit 211 controls changeovers between additional functions currently being executed corresponding to information transmitted by the additional function change control unit 225, and controls simultaneous display of the dual LCD by executing more than one additional function. Additionally, the control unit 211 controls display of additional functions generated or provided corresponding to an input mode setting signal, user data, or guide message.

In an exemplary implementation, the control unit 211 identifies activation and deactivation of a service mode, namely, operation states corresponding to information transmitted by the sensing unit 223. If the service mode is activated, the control unit 211 controls detection of the direction and range of the mobile terminal's rotation, and controls switching on/off and automatic display of each LCD corresponding to information transmitted by the sensing unit 223.

In the state that the service mode is activated, the control unit 211 identifies the input information. If the information is for driving the first display unit 219, the control unit 211 automatically displays an additional function screen by switching on the first display unit 219 and switching off the second display unit 221. If the information is for operating the second display unit 221, the control unit 211 automatically displays an additional function screen by switching on the second display unit 221 and switching off the first display unit 219. If the information is for operating the dual LCD, the control unit 211 controls such that requested additional functions are displayed on the first display unit 219 and on the second display unit 221 by switching on the first display unit 219 and the second display unit 221.

When the service mode is deactivated, the control unit 211 identifies information requested by the user, and controls a display operation corresponding to the information, such as on/off control of the display unit and display of additional function screens. That is, the operation of the dual LCD is manually controlled by the user.

The camera 213 takes a picture, and transmits an analog signal to the signal processing unit 215. The signal processing unit 215 outputs an image signal by converting the analog signal received from the camera 213 to a digital signal.

The image processing unit 217 generates screen data to display the image signal output by the signal processing unit 215. Under the control of the control unit 211, the image processing unit 215 transmits the image data or an additional function screen to the first display unit 219 and the second display unit 221 according to their configurations, and compresses or decompresses the input image data.

The first display unit 219 and the second display unit 221 are automatically switched on/off by the control of the control unit 211, and display the image data output by the image processing unit 217 and the additional function screen. Additionally, the first display unit 219 and the second display unit 221 display execution or setup screens according to the application programs for the additional functions and mode setting guide messages corresponding to the control of the control unit 211.

The sensing unit 223 may include an acceleration sensor, a gyro sensor, or a combination thereof. The acceleration sensor or gyro sensor generally outputs an analog value, and outputs a digital value by including an analog-to-digital converter for digital operation. The sensing unit 223 detects the direction and range of the mobile terminal's rotation by using the acceleration sensor or gyro sensor, and generates and transmits the corresponding information. Additionally, the sensing unit 223 may include any other means performing the same function as the above described sensor.

Hereinafter, an acceleration sensor is described as a typical example of the sensing unit 223 to clarify the subject matter of the present invention.

The acceleration sensor detects acceleration, speed, and displacement of the mobile terminal by using 3-dimensional acceleration information, and thereby movement of the mobile terminal may be identified. The acceleration information includes a gravity acceleration component and a relative acceleration component induced by the movement of the mobile terminal.

By using an acceleration sensor installed in the mobile terminal, the acceleration sensor generates 3-dimensional (in the directions of x-axis, y-axis, and z-axis) acceleration information of different values according to the skew of the mobile terminal as shown in FIG. 1A.

In an exemplary embodiment of the present invention, automatic switching on/off operation is described, based on the acceleration information of the z-axis direction of the acceleration sensor, which varies according to the skew of the mobile terminal to the ground. However, the present invention is not limited thereto. Any combination out of the x-axis, y-axis, and z-axis components of the acceleration information of the acceleration sensor may be used for the automatic switching on/off operation.

The control unit 211 collects acceleration information in the x-axis, y-axis, and z-axis output by the acceleration sensor. In an exemplary embodiment of the present invention, the control unit 211 utilizes the acceleration information in the z-axis as described above. Subsequently, the control unit 211 controls automatic switching on/off of the dual LCD by converting the collected acceleration information into a specific value expressed in momentum energy and comparing the value with a predetermined critical value.

If the specific value exceeds the critical value, the control unit 211 transmits information for driving the second display unit 219. If the specific value is smaller than the critical value, the control unit 211 transmits information for driving the first display unit 221. Operation of the display units may be set in a reverse manner by changing the comparison method between the specific value and the critical value.

The additional function change control unit 225 controls a changeover between additional functions displayed on the first display unit 219 and the second display unit 221, and controls automatic display of execution screens of the additional functions corresponding to on/off states of the first display unit 219 and the second display unit 221. For example, while displaying a character message input screen on the first display unit 219, if operation control information for the second display unit 221 is received by rotating the mobile terminal, the additional function change control unit 225 controls display of an additional function execution screen, such as a MP3 execution screen, on the second display unit 221 corresponding to the drive control information.

Figure 3:
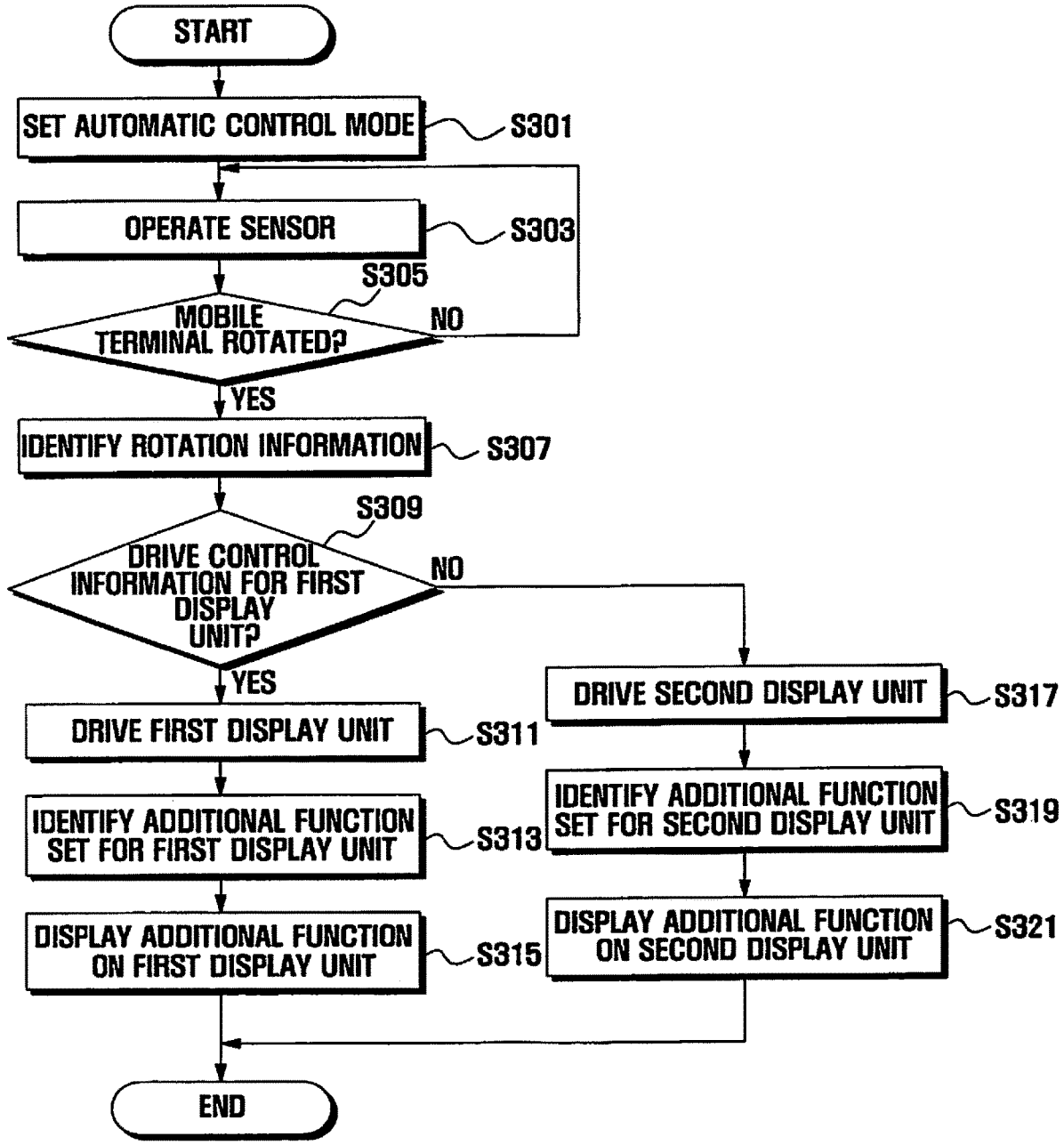
FIG. 3 is a flow chart showing a method for automatically switching on/off and displaying a dual LCD in a mobile terminal according to an exemplary embodiment of the present invention.

FIG. 3 is a flow chart showing a method for automatically switching on/off and displaying a dual LCD in a mobile terminal according to an exemplary embodiment of the present invention.

Referring to FIG. 3, when a user sets an automatic control mode to use an automatic on/off control function using a sensor for a dual LCD, the control unit changes and stores the setting of the automatic control mode according to the user's mode setting signal (S301). Subsequently, the control unit controls the operation of the sensor, and detects the mobile terminal rotation by using the sensor (S303).

If a rotation of the mobile terminal is detected (S305), the control unit receives rotation information generated by the sensing unit corresponding to the rotation of the mobile terminal, and identifies the rotation information of the mobile terminal (S307).

The control unit then checks whether the rotation information identified in step S307 is operation control information for a first display unit (S309).

When the sensing unit is an acceleration sensor, the rotation information may include 3-dimensional rotation information (in the directions of x-axis, y-axis, and z-axis) output by the acceleration sensor. The control unit collects the 3-dimensional acceleration information, and compares a specific value obtained by collecting the acceleration information with a predetermined critical value. According to the result of the comparison, the control unit generates a drive control signal for the first display unit or for the second display unit.

According to the check result in step S309, if the rotation information is a drive control signal for the first display unit, the control unit drives the first display unit (S311). The control unit then identifies an additional function set for automatic execution in the first display unit (S313). The control unit displays the corresponding additional function identified in step S313 on the first display unit (S315).

According to the check result in step S309, if the rotation information is not a drive control signal for the first display unit, the control unit drives the second display unit (S317). The control unit then identifies an additional function set for automatic execution in the second display unit (S319). The control unit displays the corresponding additional function identified in step S319 on the second display unit (S321).

In an exemplary implementation, the second display unit is automatically switched off while operating the first display unit and the first display unit is automatically switched off while operating the second display unit. However, according to the setting method, the first and second display units may be simultaneously displayed by maintaining operation states of the first and second display units individually.

Figure 4A:
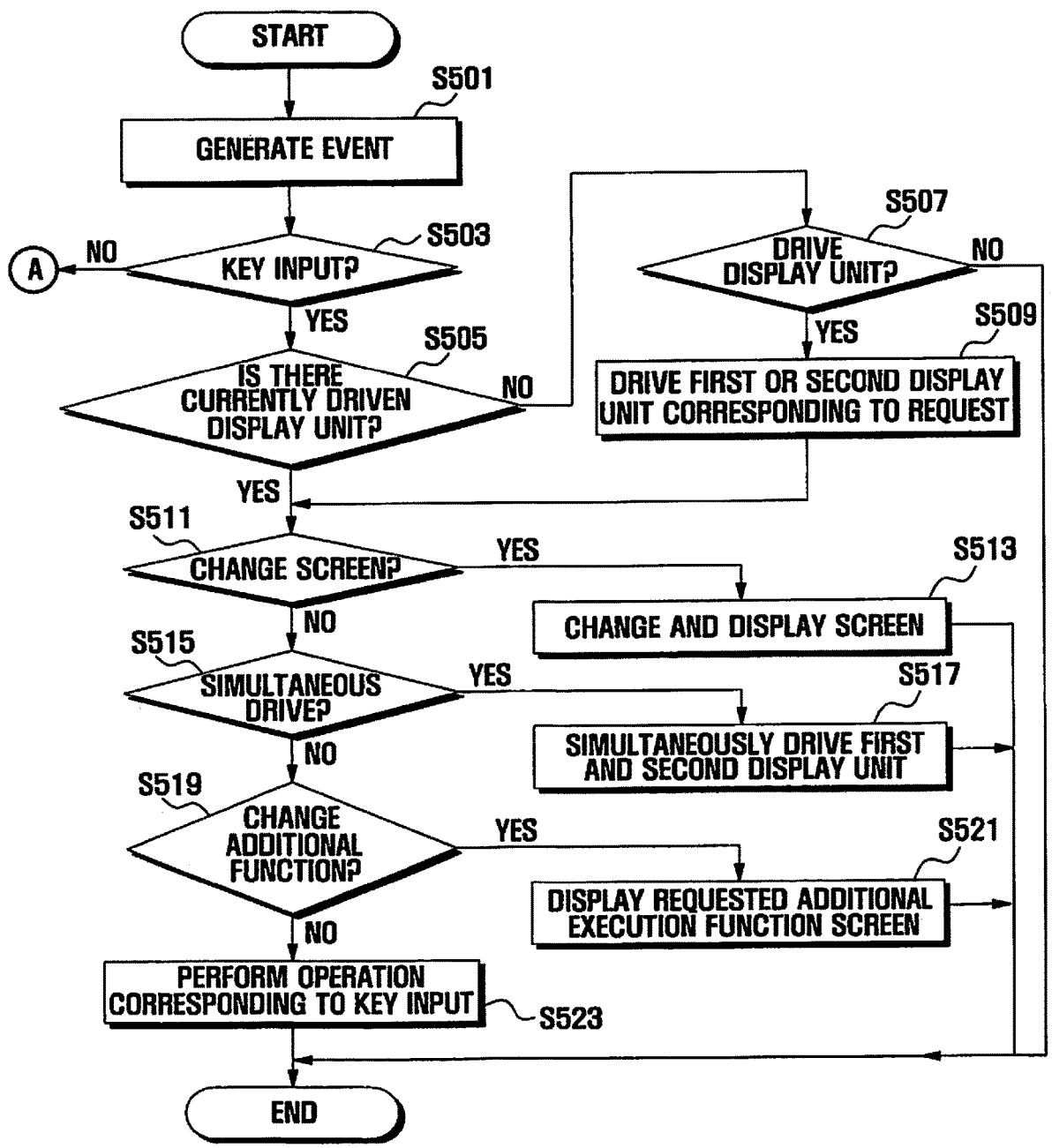
FIGS. 4A and 4B are flow charts showing an operating method for a user's key input in a mobile terminal having a dual LCD, according to an exemplary embodiment of the present invention.
Figure 4B:
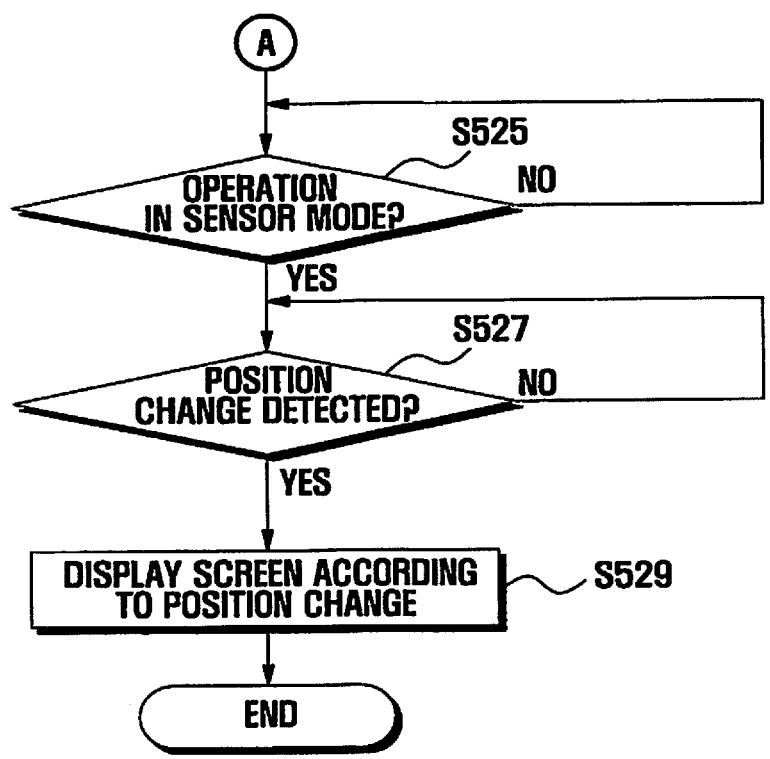

FIGS. 4A and 4B are flow charts showing an operating method for a user's key input in a mobile terminal having a dual LCD, according to an exemplary embodiment of the present invention.

Referring to FIGS. 4A and 4B, the mobile terminal detects and identifies an event generated by a user (S501). The mobile terminal then checks whether the event is generated by the user's key input (S503). If the event is generated by the user's key input, the mobile terminal checks whether there is a currently operating display unit (S505).

According to the check result in step S505, if no display unit is currently operating, the mobile terminal checks whether the key input is for driving a display unit (S507). If the key input is for driving a display unit in step S507, the mobile terminal drives the display unit (that is, the first display unit and/or the second display unit) that corresponds to the user's request (S509).

If a display unit is currently driven in step S505 or if the first and/or second display units are currently driven in step S509, an operation corresponding to the key input is performed as follows. If a screen change is requested by the user (S511), a screen currently being displayed on a display unit (for example, the first display unit) is displayed on the other display unit (for example, the second display unit) (S513). While an additional function screen such as a multimedia message service (MMS) screen is displayed on the first display unit, if the user wants to execute the MMS screen on the second display unit, a screen change to the second display unit is performed by using a predetermined function key or a soft key allocated to a screen change function.

If a simultaneous operation of the first and second display units is requested by the user (S515), an additional function screen currently being executed is simultaneously displayed on the first and second display units corresponding to the user's request (S517). Alternatively, different additional function screens may be individually displayed on the first and second display units corresponding to the user's request.

If an additional function change is requested for the currently executing additional function (S519), a new additional function screen is displayed on the first and/or second display units corresponding to the user's request (S521). For example, if the user requests a MP3 execution through the first display unit on which an MMS screen is currently being executed, the MP3 execution screen is displayed on a display unit requested by the user or on a display unit predetermined for the MP3 execution.

If the user's key input is not for the control of the dual LCD display, an operation such as a call connection for voice communication is performed corresponding to the user's request (S523).

If the event is not generated by the user's key input in step S503, and if the event is identified as an automatic control of the dual LCD in a sensor mode (S525), the mobile terminal detects whether its position changes (S527). If a position change of the mobile terminal is detected, on off states of the first and/or second display units, screen change, and automatic display of an additional function screen are controlled according to the position change (S529).

Figure 5:
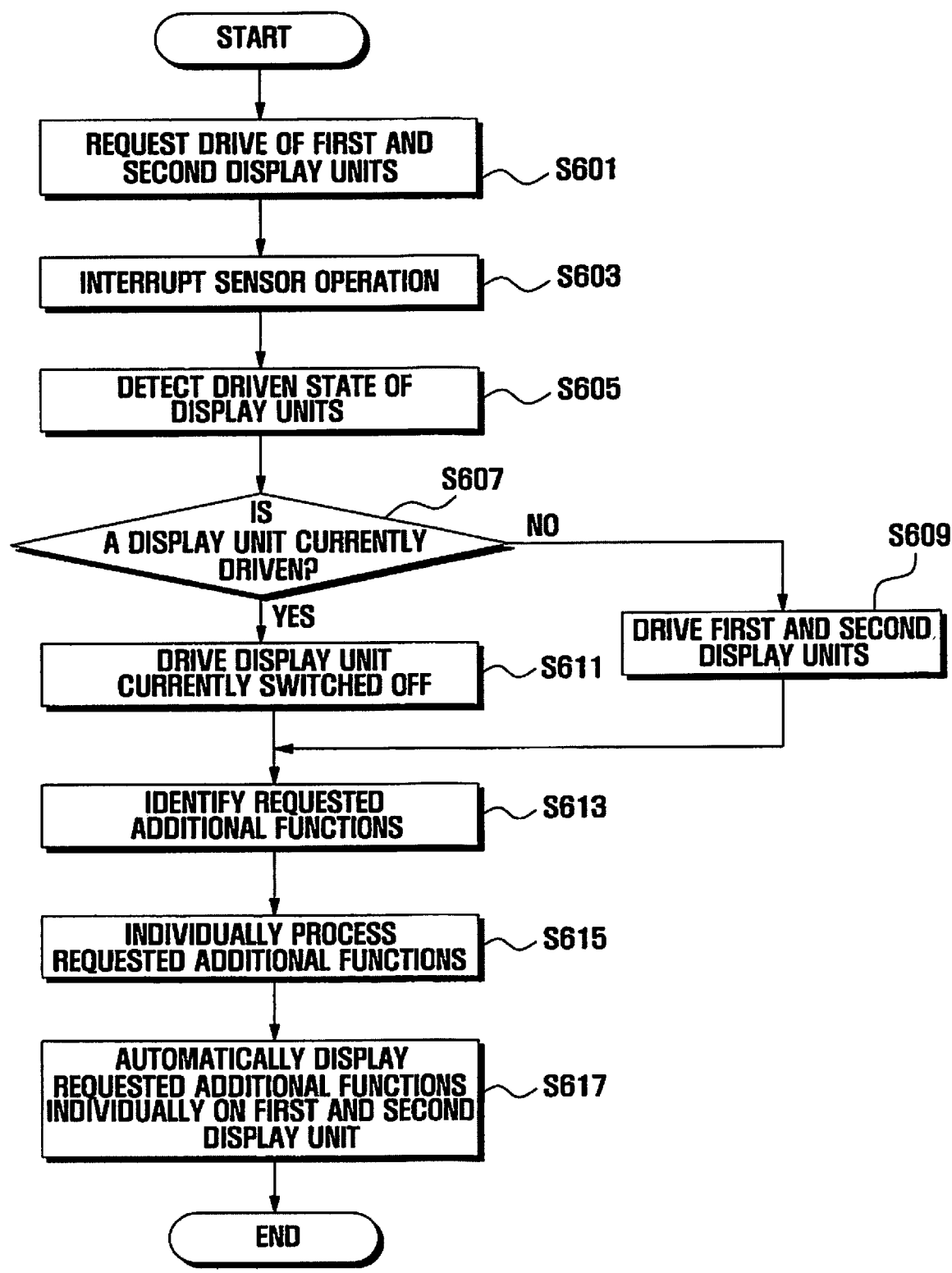
FIG. 5 is a flow chart showing a method for controlling a dual LCD corresponding to a user's request in a mobile terminal according to an exemplary embodiment of the present invention.

FIG. 5 is a flow chart showing a method for controlling a dual LCD corresponding to a user's request in a mobile terminal according to an exemplary embodiment of the present invention.

Referring to FIG. 5, a key input for driving the dual LCD, such as a control command for a simultaneous drive of the first and second display unit, is generated, and the operation state of a sensor is identified (S601). If the sensor is in operation, the operation of the sensor is interrupted (S603).

The driven state of the display units is detected (S605), and whether a display unit is currently driven is determined (S607). If no display unit is currently driven, the first and second display units are driven (S609). If a display unit is currently driven, a display unit switched off (for example, the second display unit) is driven (S611).

After driving the first and/or second display unit (S609 and S611), additional functions requested by the user are identified (S613), and processed individually (S615).

After individually processing the requested additional functions, the requested additional function screens are automatically displayed on the first and second display units individually (S617). For example, additional functions requested by the user may be a character message input through the first display unit and an MP3 execution through the second display unit. The character message input and the MP3 execution are automatically displayed on the first and second display units respectively.

Figure 6A:
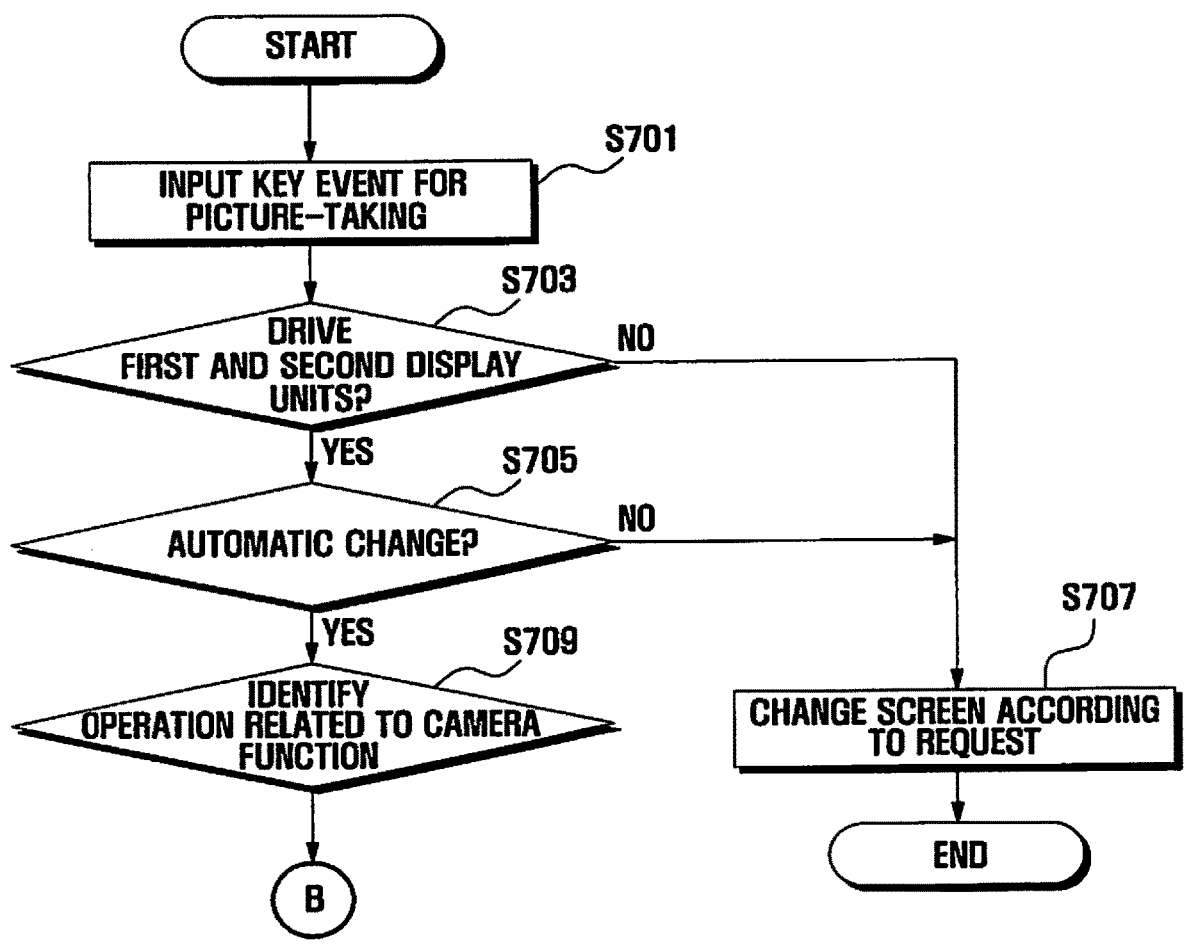
FIGS. 6A and 6B are flow charts showing a method for executing additional functions by using a dual LCD in a mobile terminal according to an exemplary embodiment of the present invention.
Figure 6B:
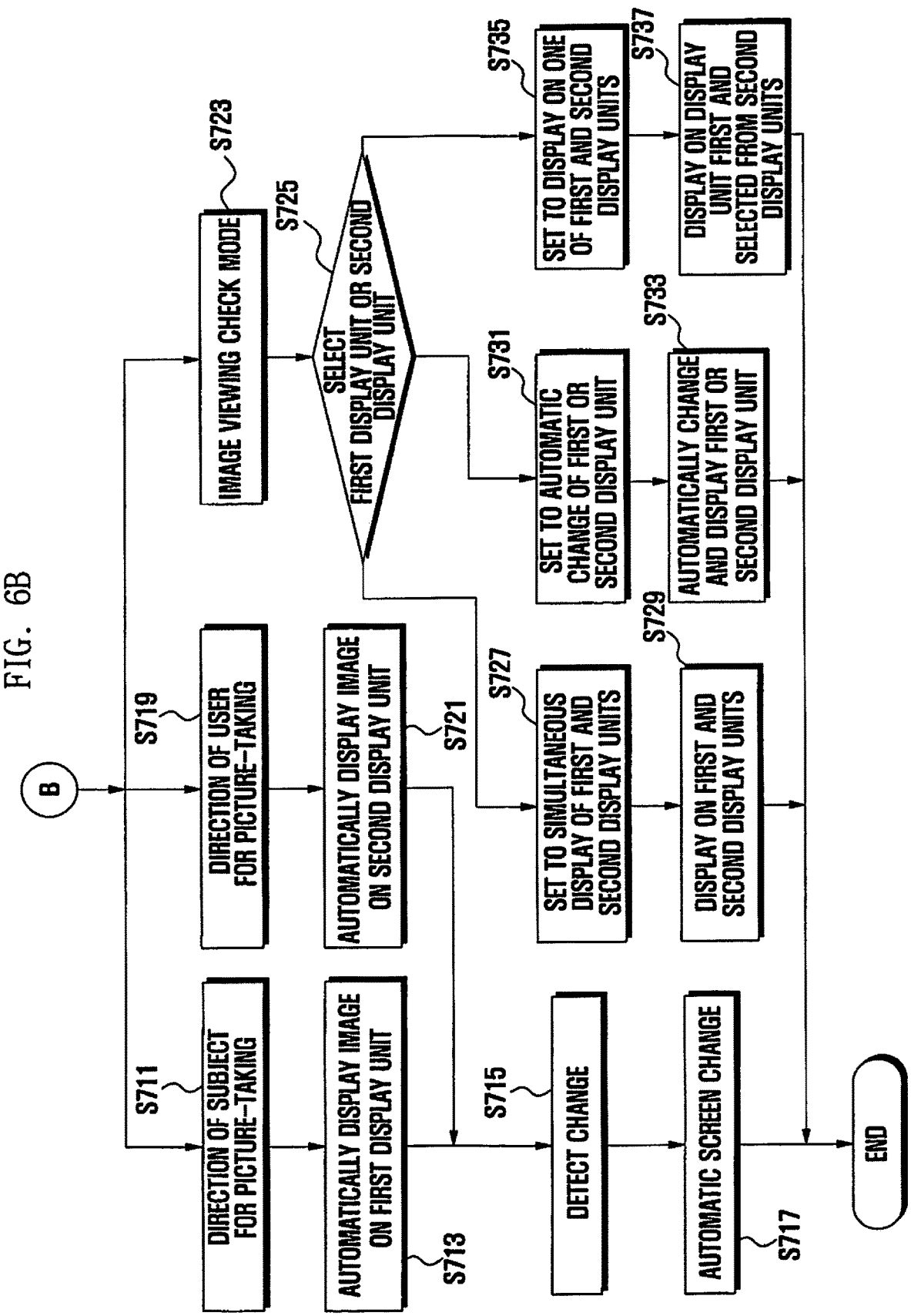

FIGS. 6A and 6B are flow charts showing a method for executing additional functions by using a dual LCD in a mobile terminal according to an exemplary embodiment of the present invention.

FIGS. 6A and 6B illustrate a method for utilizing a dual LCD with an additional function of a camera. When an event of using the camera is generated (S701), it is determined whether the additional function of a camera is performed through a single display unit (that is, using the first display unit or the second display unit according to a user's setting) (S703).

If a response signal for the check result of step S703 is for execution of the additional function using a single LCD, a screen is displayed corresponding to the user's request (S707). For example, if the user requests an operation through the first display unit, an image taken by the camera is displayed on the first display unit according to the user's request, and if the user requests an operation through the second display unit, the image taken by the camera is displayed on the second display unit.

If a response signal for the check result of step S703 is for execution of the additional function using a dual LCD, an automatic or manual mode is determined (S705). If a manual mode is selected in step S705, a screen change is performed corresponding to the user's request (S707). For example, a screen change to the first or second display unit is performed, and the image taken by the camera is displayed on the corresponding display unit.

If an automatic mode is selected in step S705, an operation related to the camera function is identified (S709).

For example, if the camera faces in the direction of a subject for picture-taking (S711), an image taken by the camera is automatically displayed on the first display unit (S713). Alternatively, if the camera faces in the direction of the user for self picture-taking (S719), an image of the user taken by the camera is displayed on the second display unit (S721).

After displaying the image on the first or second display unit, a direction change (that is, rotation) of the camera is detected (S715), and display screens of the first and second display units are automatically changed (S717). For example, when an image taken by the camera is currently displayed on the first display unit, the direction of the camera is changed due to the rotation of the mobile terminal, and the image taken by the camera is displayed on the second display unit.

As another example, a check mode for viewing an image that is being taken or already taken is requested by the user (S723), and a display mode corresponding to the check mode is selected (S725).

For example, if a simultaneous display mode is selected for displaying an image on both first and second display units (S727), the image is simultaneously displayed on the first and second display units (S729). Alternatively, if an automatic display mode is selected for displaying an image on the first or second display unit according to operation of a sensor (S731), the image is automatically displayed corresponding to on/off states of the first or second display unit (S733). If a single display mode is selected for displaying an image on the first or second display unit (S735), the image is displayed on one of the first and second display units selected by a user's setting (S737). The display of an image on the first and second display units may be manually selected according to a user's request.

Although not illustrated in FIGS. 6A and 6B, as another example, if a dual LCD mode is selected in relation to the camera function, both user and subject of picture-taking may see an image by displaying the image taken by the camera simultaneously on the first and second display units.

Figure 7:
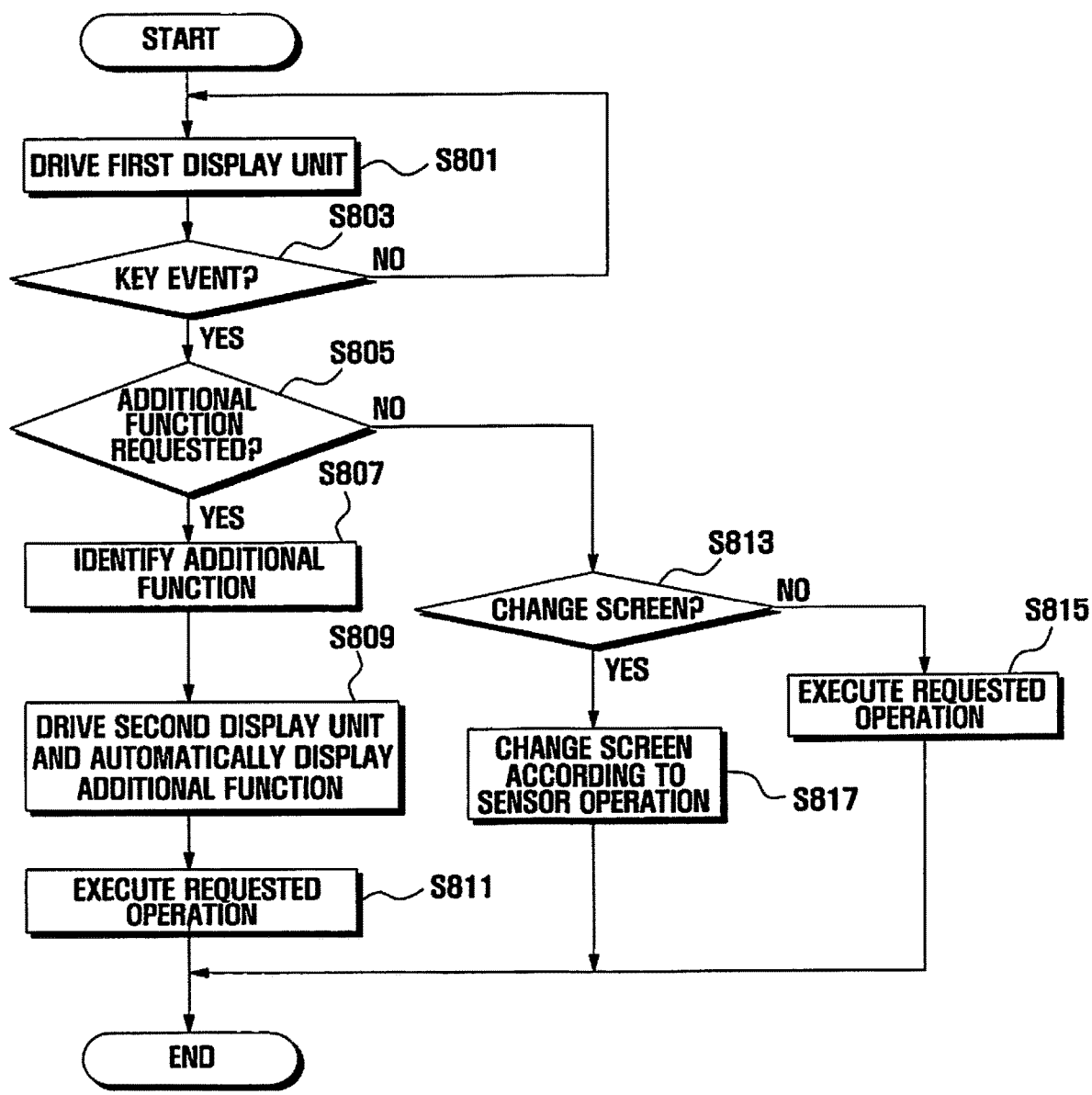
FIG. 7 is a flow chart showing another method for executing additional functions by using a dual LCD in a mobile terminal according to an exemplary embodiment of the present invention.

FIG. 7 is a flow chart showing another method for executing additional functions by using a dual LCD in a mobile terminal according to an exemplary embodiment of the present invention.

FIG. 7 illustrates a method for displaying different additional function screens individually on the dual LCD according to an exemplary embodiment of the present invention. First, an additional function screen, such as a screen for displaying an image taken by a camera data, is displayed by driving a first display unit (S801). In this state, if a key event is generated by a user (S803), it is identified whether the key event is for execution of an additional function (such as a MP3) (S805).

According to the result of step S805, if the key event is for execution of an additional function, the type of the additional function (for example, MP3 function) is identified (S807), and an execution screen of the identified additional function (for example, a MP3 execution screen) is automatically displayed by driving a second display unit (S809). Subsequently, an operation requested by a user is executed in relation to the additional function of executing MP3 (S811). While displaying the MP3 execution screen by driving the second display unit, an image displayed on the first display unit is maintained. Therefore, the user may see both image screen and MP3 execution screen through two display units, and may also change the execution screens individually to other additional functions.

If the key event is not for execution of an additional function in step S805, it is identified whether a screen change is requested (S813). If a screen change is not requested in step S813, an operation requested by the user is performed (S815). For example, changes between additional functions, such as editing an image displayed on the first display unit, picture-taking by using a camera function, and inputting a character message by using a short message service (SMS), may be performed.

If a screen change is requested in step S813, the screen change according to the operation of a sensor (that is, an automatic display corresponding to on/off states of the first and second display units) is performed (S817).

As described above, by using an apparatus and a method for automatic screen on/off control in a mobile terminal according to exemplary embodiments of the present invention, various additional functions utilizing a dual LCD may be provided for the mobile terminal, and user convenience may be improved. Additionally, a plurality of additional function screens may be displayed simultaneously or selectively by using the automatic on/off control of a dual LCD in the mobile terminal, and thereby the operation efficiency of a mobile terminal user may be improved.

Exemplary embodiments of the present invention can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, magnetic tapes, floppy disks, optical data storage devices, and carrier waves (such as data transmission through the Internet via wired or wireless transmission paths). The computer-readable recording medium can also be distributed over network-coupled computer systems so that the computer-readable code is stored and executed in a distributed fashion. Also, function programs, codes, and code segments for accomplishing the present invention can be easily construed as within the scope of the invention by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of operating a portable communication device, the method comprising:
   receiving an input for request of operating a camera of the portable communication device;
   determining a switching mode relating to a display area of a video image that is obtained via the camera, based on a first user input on a first display area or a second display area, the first display area being disposed in a first surface of the portable communication device and the second display area being disposed in a second surface being opposite to the first surface of the portable communication device;
   when the determined switching mode is a first switching mode:
      providing the video image that is obtained via the camera through the first display area;
      while providing the video image that is obtained via the camera through the first display area or the second display area, detecting a rotation of the portable communication device; and
      in response to detecting the rotation, switching the display area providing the video image between the first display area and the second display area; and
   when the determined switching mode is a second switching mode:
      providing the video image that is obtained via the camera through both the first display area and the second display area; and
      when detecting the rotation of the portable communication device, maintaining the providing of the video image through both the first display area and the second display area,
   wherein detecting the rotation of the portable communication device comprises detecting a flipping over of an entirety of the portable communication device.

2. The method of claim 1, wherein providing the video image comprises providing the video image that is obtained via the camera disposed in the first surface of the portable communication device through at least the first display area in a first capture mode, such that the portable communication device allows a user to take a picture of the user by the camera, while watching the video image of the user being obtained via the camera.

3. The method of claim 1, wherein providing the video image comprises providing the video image that is obtained via the camera disposed in the first surface of the portable communication device through at least the second display area in a second capture mode, such that the portable communication device allows a user to take a picture of an object at which a user is looking, while watching the video image of the object being obtained via the camera.

4. The method of claim 1, further comprising:
   while providing the video image that is obtained via the camera through the first display area or through the second display area, detecting a second user input on the first display area or the second display area for switching a display area providing the video image between the first display area and the second display area; and
   based on detecting the second user input for switching, switching the display area providing the video image between the first display area and the second display area.

5. A portable communication device, comprising:
   a touchscreen display including a first display area disposed in a first surface of the portable communication device and a second display area disposed in a second surface being opposite to the first surface of the portable communication device;
   a sensor;
   a camera; and
   a processor configured to:
      receive an input for request of operating the camera,
      determine a switching mode relating to a display area of a video image that is obtained via the camera, based on a first user input on the first display area or the second display area,
      when the determined switching mode is a first switching mode:
         provide the video image that is obtained via the camera through the first display area or the second display area, while providing the video image obtained via the camera through the first display area or the second display area, detect, via the sensor, a rotation of the portable device, and in response to detecting the rotation, switch the display area providing the video image between the first display area and the second display area, and when the determined switching mode is a second switching mode:

provide the video image that is obtained via the camera through both the first display area and the second display area, and when detecting the rotation of the portable communication device, maintain the providing of the video image through both the first display area and the second display area, wherein detecting the rotation of the portable communication device comprises detecting a flipping over of an entirety of the portable communication device.

6. The portable communication device of claim 5, wherein the processor is further configured to provide the video image that is obtained via the camera disposed in the first surface of the portable communication device through at least the first display area in a first capture mode, such that the portable communication device allows a user to take a picture of the user by the camera, while watching the video image of the user being obtained via the camera.

7. The portable communication device of claim 5, wherein the processor is further configured to provide the video image that is obtained via the camera disposed in the first surface of the portable communication device through at least the second display area in a second capture mode, such that the portable communication device allows a user to take a picture of an object at which a user is looking, while watching the video image of the object being obtained via the camera.

8. The portable communication device of claim 5, wherein the processor is further configured to:

while providing the video image that is obtained via the camera through the first display area or through the second display area, detect a second user input on the first display area or the second display area for switching the display area providing the video image between the first display area and the second display area, and based on detecting the second user input for switching, switch the display area providing the video image between the first display area and the second display area.

* * * * *